(12) United States Patent
Marks

(10) Patent No.: US 7,663,689 B2
(45) Date of Patent: Feb. 16, 2010

(54) METHOD AND APPARATUS FOR OPTIMIZING CAPTURE DEVICE SETTINGS THROUGH DEPTH INFORMATION

(75) Inventor: Richard L. Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 633 days.

(21) Appl. No.: 10/758,817

(22) Filed: Jan. 16, 2004

(65) Prior Publication Data

US 2005/0157204 A1   Jul. 21, 2005

(51) Int. Cl.
*H04N 5/222*   (2006.01)

(52) U.S. Cl. ...................................................... 348/370
(58) Field of Classification Search ................ 348/42, 348/222.1, 223.1, 224.1, 335, 362, 363, 370, 348/371; 345/462, 611, 839; 375/240.08; 382/107, 115, 154, 173, 203, 283
See application file for complete search history.

(56) References Cited

U.S. PATENT DOCUMENTS

| | | | | |
|---|---|---|---|---|
| 3,943,277 A | 3/1976 | Everly et al. | | 348/19 |
| 4,263,504 A | 4/1981 | Thomas | | 235/454 |
| 4,313,227 A | 1/1982 | Eder | | 398/106 |
| 4,558,864 A | 12/1985 | Medwedeff | | 273/148 B |
| 4,565,999 A | 1/1986 | King et al. | | 345/158 |
| 4,591,842 A * | 5/1986 | Clarke et al. | | 345/634 |
| 4,802,227 A | 1/1989 | Elko et al. | | 381/92 |
| 4,823,001 A | 4/1989 | Kobayashi et al. | | 356/616 |
| 4,843,568 A | 6/1989 | Krueger et al. | | 382/100 |
| 5,034,986 A | 7/1991 | Karmann et al. | | 382/103 |
| 5,055,840 A | 10/1991 | Bartlett | | 341/31 |
| 5,111,401 A | 5/1992 | Everett et al. | | 701/24 |
| 5,144,594 A | 9/1992 | Gilchrist | | 367/129 |
| 5,260,556 A | 11/1993 | Lake et al. | | 235/494 |
| 5,297,061 A | 3/1994 | Dementhon et al. | | 345/180 |
| 5,335,011 A | 8/1994 | Addeo et al. | | 348/15 |
| 5,426,450 A | 6/1995 | Drumm | | 345/168 |

(Continued)

FOREIGN PATENT DOCUMENTS

EP   0 353 200 A2   1/1990

(Continued)

OTHER PUBLICATIONS

Ronen Gvili, Amir Kaplan, Dr. Eyal Ofek and Giora Yahav, "Depth Keying", 2003, SPIE, Proceedings of SPIE-IS&T Electronic Imaging, SPIE vol. 5006 (2003), pp. 564-574.*

(Continued)

*Primary Examiner*—Tuan Ho
*Assistant Examiner*—Kent Wang
(74) *Attorney, Agent, or Firm*—Martine Penilla & Gencarella, LLP

(57) ABSTRACT

A method for adjusting image capture settings for an image capture device is provided. The method initiates with identifying a scene. Then, an image of the scene is captured. The method includes generating a depth mask of the scene from data defining the image of the scene. Then, pixel values corresponding to objects within any one or both of a foreground region and a background region of the captured image are adjusted based upon bit values of the depth mask. An image capture device and a system are provided.

37 Claims, 8 Drawing Sheets

U.S. PATENT DOCUMENTS

| | | | |
|---|---|---|---|
| 5,455,685 A * | 10/1995 | Mori | 348/363 |
| 5,517,333 A | 5/1996 | Tamura et al. | 358/158 |
| 5,534,917 A | 7/1996 | MacDougall | |
| 5,543,818 A | 8/1996 | Scott | 345/168 |
| 5,557,684 A * | 9/1996 | Wang et al. | 382/107 |
| 5,563,988 A | 10/1996 | Maes et al. | |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,616,078 A | 4/1997 | Oh | 463/8 |
| 5,638,228 A | 6/1997 | Thomas, III | 360/60 |
| 5,649,021 A | 7/1997 | Matey et al. | |
| 5,677,710 A | 10/1997 | Thompson-Rohrlich | 345/173 |
| 5,706,364 A * | 1/1998 | Kopec et al. | 382/159 |
| 5,768,415 A | 6/1998 | Jagadish et al. | |
| 5,796,354 A | 8/1998 | Cartabiano et al. | 341/22 |
| 5,818,424 A | 10/1998 | Korth | 345/158 |
| 5,850,222 A | 12/1998 | Cone | 345/418 |
| 5,850,473 A | 12/1998 | Andersson | 382/165 |
| 5,870,100 A * | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A * | 6/1999 | Gajewska | 345/597 |
| 5,917,493 A | 6/1999 | Tan et al. | 715/835 |
| 5,917,936 A | 6/1999 | Katto | |
| 5,923,318 A | 7/1999 | Zhai et al. | 345/157 |
| 5,929,444 A | 7/1999 | Leichner | 250/341.7 |
| 5,930,383 A | 7/1999 | Netzer | 382/154 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | |
| 6,014,167 A | 1/2000 | Suito et al. | |
| 6,021,219 A | 2/2000 | Andersson et al. | 382/190 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | |
| 6,061,055 A | 5/2000 | Marks | |
| 6,072,494 A | 6/2000 | Nguyen | 715/863 |
| 6,075,895 A | 6/2000 | Qiao et al. | |
| 6,091,905 A | 7/2000 | Yahav et al. | 396/106 |
| 6,097,369 A | 8/2000 | Wambach | 345/158 |
| 6,100,517 A | 8/2000 | Yahav et al. | 250/208.1 |
| 6,101,289 A | 8/2000 | Kellner | 382/276 |
| 6,115,052 A | 9/2000 | Freeman et al. | 345/473 |
| 6,134,346 A * | 10/2000 | Berman et al. | 382/163 |
| 6,151,009 A | 11/2000 | Kanade et al. | 345/113 |
| 6,160,540 A | 12/2000 | Fishkin et al. | 345/184 |
| 6,173,059 B1 | 1/2001 | Huang et al. | 381/92 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | |
| 6,215,898 B1 | 4/2001 | Woodfill et al. | 382/154 |
| 6,243,074 B1 | 6/2001 | Fishkin et al. | 345/156 |
| 6,243,491 B1 | 6/2001 | Anderrson | |
| 6,252,632 B1 * | 6/2001 | Cavallaro | 348/585 |
| 6,275,213 B1 | 8/2001 | Tremblay et al. | 345/156 |
| 6,281,930 B1 | 8/2001 | Parker et al. | 348/211.9 |
| 6,297,838 B1 | 10/2001 | Chang et al. | 715/863 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | |
| 6,351,661 B1 | 2/2002 | Cosman | 600/426 |
| 6,371,849 B1 | 4/2002 | Togami | |
| 6,392,644 B1 | 5/2002 | Miyata et al. | 345/419 |
| 6,393,142 B1 * | 5/2002 | Swain et al. | 382/154 |
| 6,394,897 B1 | 5/2002 | Togami | |
| 6,400,374 B2 | 6/2002 | Lanier | |
| 6,411,392 B1 * | 6/2002 | Bender et al. | 358/1.14 |
| 6,411,744 B1 | 6/2002 | Edwards | |
| 6,417,836 B1 | 7/2002 | Kumar et al. | |
| 6,441,825 B1 | 8/2002 | Peters | |
| 6,473,516 B1 * | 10/2002 | Kawaguchi et al. | 382/100 |
| 6,513,160 B2 | 1/2003 | Dureau | 725/9 |
| 6,542,927 B2 | 4/2003 | Rhoads | 709/217 |
| 6,545,706 B1 | 4/2003 | Edwards et al. | |
| 6,556,704 B1 * | 4/2003 | Chen | 382/154 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,593,956 B1 | 7/2003 | Potts et al. | 348/14.09 |
| 6,595,642 B2 | 7/2003 | Wirth | 351/211 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,677,967 B2 * | 1/2004 | Sawano et al. | 715/839 |
| 6,677,987 B1 | 1/2004 | Girod | 348/171 |
| 6,709,108 B2 | 3/2004 | Levine et al. | 351/211 |
| 6,720,949 B1 | 4/2004 | Pryor et al. | 345/158 |
| 6,751,338 B1 | 6/2004 | Wallack | 382/106 |
| 6,753,849 B1 | 6/2004 | Curran et al. | 345/158 |
| 6,769,769 B2 * | 8/2004 | Podoleanu et al. | 351/221 |
| 6,772,057 B2 | 8/2004 | Breed et al. | 704/45 |
| 6,774,939 B1 | 8/2004 | Peng | 348/231.4 |
| 6,785,329 B1 * | 8/2004 | Pan et al. | 375/240.08 |
| 6,789,967 B1 | 9/2004 | Forester | 400/489 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,847,311 B2 | 1/2005 | Li | 341/28 |
| 6,881,147 B2 | 4/2005 | Naghi et al. | 463/35 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,931,125 B2 | 8/2005 | Smallwood | 379/433.07 |
| 6,943,776 B2 | 9/2005 | Ehrenburg | 345/168 |
| 6,947,576 B2 | 9/2005 | Stam et al. | 382/104 |
| 6,951,515 B2 | 10/2005 | Ohshima et al. | 463/31 |
| 6,952,198 B2 | 10/2005 | Hansen | 345/158 |
| 6,970,183 B1 | 11/2005 | Monroe | 348/143 |
| 7,016,116 B2 * | 3/2006 | Dolgoff | 359/630 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,054,452 B2 | 5/2006 | Ukita | 381/92 |
| 7,059,962 B2 | 6/2006 | Watashiba | 463/2 |
| 7,061,507 B1 * | 6/2006 | Tuomi et al. | 345/611 |
| 7,098,891 B1 | 8/2006 | Pryor | 345/158 |
| 7,102,615 B2 | 9/2006 | Marks | 345/156 |
| 7,106,366 B2 * | 9/2006 | Parker et al. | 348/222.1 |
| 7,116,330 B2 | 10/2006 | Marshall et al. | 345/474 |
| 7,139,767 B1 | 11/2006 | Taylor et al. | 707/102 |
| 7,161,634 B2 * | 1/2007 | Long | 348/624 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | |
| 7,245,273 B2 | 7/2007 | Eberl et al. | 351/211 |
| 7,259,375 B2 | 8/2007 | Tichit et al. | 250/341.8 |
| 7,274,305 B1 | 9/2007 | Lutrell | 340/870.02 |

| | | | |
|---|---|---|---|
| 7,283,679 B2 * | 10/2007 | Okada et al. | 382/260 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,364,297 B2 | 4/2008 | Goldfain et al. | 351/206 |
| 7,379,559 B2 | 5/2008 | Wallace et al. | 382/100 |
| 7,446,650 B2 | 11/2008 | Scholfield et al. | 340/425.5 |
| 2001/0017932 A1 * | 8/2001 | Chang | 382/100 |
| 2001/0056477 A1 | 12/2001 | McTernan et al. | 709/219 |
| 2002/0085097 A1 | 7/2002 | Colmenarez et al. | 348/211 |
| 2002/0093670 A1 * | 7/2002 | Luo et al. | 358/1.9 |
| 2002/0134151 A1 | 9/2002 | Naruoka et al. | 73/291 |
| 2002/0158873 A1 | 10/2002 | Williamson | 345/427 |
| 2003/0012277 A1 * | 1/2003 | Azuma et al. | 375/240.08 |
| 2003/0020718 A1 | 1/2003 | Marshall et al. | |
| 2003/0025822 A1 * | 2/2003 | Shimada | 348/370 |
| 2003/0032466 A1 | 2/2003 | Watashiba | |
| 2003/0093591 A1 | 5/2003 | Hohl | 710/22 |
| 2003/0100363 A1 | 5/2003 | Ali | |
| 2003/0123705 A1 | 7/2003 | Stam et al. | 382/104 |
| 2003/0160862 A1 | 8/2003 | Charlier et al. | 348/14.08 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0105032 A1 * | 6/2004 | Kim et al. | 348/607 |
| 2004/0140955 A1 | 7/2004 | Metz | 345/156 |
| 2004/0213419 A1 | 10/2004 | Varma et al. | 381/92 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0105777 A1 * | 5/2005 | Kozlowski et al. | 382/115 |
| 2005/0117045 A1 | 6/2005 | Abdellatif et al. | 384/335 |
| 2006/0033713 A1 | 2/2006 | Pryor | 345/158 |
| 2006/0035710 A1 | 2/2006 | Festejo et al. | 463/36 |
| 2007/0066394 A1 | 3/2007 | Ikeda et al. | 463/37 |
| 2007/0120834 A1 | 5/2007 | Boillot | |
| 2007/0120996 A1 | 5/2007 | Boillot | |
| 2008/0056561 A1 | 3/2008 | Sawachi | |
| 2008/0070684 A1 | 3/2008 | Haigh-Hutchinson | |
| 2009/0010494 A1 | 1/2009 | Bechtel et al. | 382/104 |

FOREIGN PATENT DOCUMENTS

| | | |
|---|---|---|
| EP | 0353200 | 1/1990 |
| EP | 0 613 294 A1 | 8/1994 |
| EP | 0652686 | 5/1995 |
| EP | 0 750 202 A1 | 12/1996 |
| EP | 0750202 | 12/1996 |
| EP | 0 823 683 A1 | 2/1998 |
| EP | 1435258 | 7/2004 |
| FR | 2814965 | 4/2002 |
| FR | 2 832 892 | 5/2003 |
| GB | 2206716 | 11/1989 |
| GB | 2376397 | 11/2002 |
| GB | 2388418 | 11/2003 |
| JP | 1284897 | 11/1989 |
| JP | 6102980 | 4/1994 |
| JP | 9128141 | 5/1997 |
| JP | 9185456 | 7/1997 |
| JP | 1138949 | 2/1999 |
| JP | 2000-172431 | 6/2000 |
| JP | 2001-166676 | 6/2001 |
| JP | 2004-145448 | 5/2004 |
| WO | WO 99/26198 | 10/1999 |
| WO | WO 01/18563 A1 | 3/2001 |
| WO | WO 02/27456 | 2/2002 |
| WO | WO 03/079179 | 9/2003 |
| WO | WO 2005/073838 | 8/2005 |

OTHER PUBLICATIONS

Gvili et al., Depth Keying, SPIE vol. 5006(2003), 2003 Proceedings of SPIE-IS&T Electronic Imaging, pp. 564-574.*

Ronen Gvili et al., Depth Keying, 2003, SPIE, SPIE vol. 5006 (2003), 2003 SPIE-IS&T, pp. 564-574.*

Gvili et al., Depth Keying, SPIE vol. 5006(2003), SPIE-IS&T, pp. 564-574.*

Gvili et al. "Depth Keying", SPIE vol. 5006 (2003), 2003 SPIE-IS &T, pp. 564-574.*

Gvili, Depth Keying, Proc. of SPIE vol. 5006 (2003), SPIE-IS&T, pp. 564-574.*

Iddan et al. "*3D Imaging in the Studio (And Elsewhere . . . )*", Proceedings of the SPIE, SPIE, Bellingham, VA, US, vol. 4298, Jan. 24, 2001, pp. 48-55, XP008005351.

Jojie et al., Tracking Self-Occluding Articulated Objects in Dense Disparity Maps, Computer Vision, 1999. The Proceedings of the Seventh IEEE International Conference on Kerkyra, Greece Sep. 20-27, 1999, Los Alamitos, CA, USA, IEEE Comput. Soc, US, Sep. 20, 1999, pp. 123-130.

"The Tracking Cube: A Three-Dimensional Input Device," IBM Technical Disclosure Bulletin, Aug. 1, 1989, pp. 91-95, vol. 32, No. 3B, IBM Corp. New York, US.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K 1A 0R6.

Hemmi, et al., "3-D Natural Interactive Interface-Using Marker Tracking from a Single View",Sep. 9, 1991, Systems and Computers in Japan.

* cited by examiner

METHOD AND APPARATUS FOR OPTIMIZING CAPTURE DEVICE SETTINGS THROUGH DEPTH INFORMATION

CROSS REFERENCE TO RELATED APPLICATIONS

This application is related to U.S. patent application Ser. No. 10/365,120 filed on Feb. 11, 2003 and entitled "METHOD AND APPARATUS FOR REAL TIME MOTION CAPTURE." This application is herein incorporated by reference in its entirety for all purposes.

BACKGROUND OF THE INVENTION

1. Field of the Invention

This invention relates generally to image capture techniques, and more particularly to enhancing a captured image of a scene by adjustments enabled through depth information.

2. Description of the Related Art

Image capture devices, whether cameras or video based devices, typically have a limited contrast ratio, which is a measure of the difference between the darkest and lightest parts of a scene. One exemplary scene may include a person in the shade and the background having bright sunlight. When the background of this scene is exposed correctly for the image capture device, there is little or no detail in the shaded person's face.

Auto-exposure and auto-gain features are commonly used to set brightness levels for the capture device. These features tend to take the entire scene and average it to apply a certain exposure or gain setting. While the averaging may work well for a scene having a great deal of images and colors, this scheme quickly breaks down as the scene has less variety.

One attempt to address the limited contrast ratio of current capture devices is through the use of a backlight feature. For instance, where there is a bright light source in the background, e.g., sunlight, backlight compensation will take the center of the scene and use that region as the average. By doing this, the center of the scene may be brightened while the bright sunlight on the edges becomes washed out or darkened. The shortcoming with backlight compensation is that the object to be brightened must be in the center of the scene. In addition, a region of the scene is used for computing the average, rather than the actual object itself, which may cause some display artifacts. Furthermore, backlight compensation does not provide a solution where there are multiple foreground images in different regions of the scene. Additionally, with backlight compensation, the foreground object is brightened, however, this is done at the expense of the detail in the background. Thus, a user is required to choose between foreground detail and background detail. Some of these shortcomings may be extended to video capture devices which may be used for interactive entertainment applications. For example, where an image of a user is incorporated into a video game, a bright light source may adversely the displayed image as described above. This adverse impact may prevent the tracking of an object of the image in addition to displaying a poor quality image.

Accordingly, there is a need to solve the problems of the prior art to provide a system and method for producing an image that has the exposure/gain and other related parameters adjusted for both the foreground and background.

SUMMARY OF THE INVENTION

Broadly speaking, the present invention fills these needs by providing a method and system that enables adjustment of segments of a scene, e.g., foreground and background images, where the foreground and background images are identified through a depth mask. It should be appreciated that the present invention can be implemented in numerous ways, including as a process, a system, or a device. Several inventive embodiments of the present invention are described below.

In one embodiment, a method for differentiating between foreground objects and background objects within a scene being captured through an image capture device is provided. The method initiates with emitting a ray of light from a light source toward an object of the scene. The method includes opening an aperture cover allowing access to a sensor of the image capture device for reflected light from the light source. Then, the aperture cover is closed after a predefined time, where the predefined amount of time corresponds to a maximum distance traveled by the light. Next, a depth mask identifying objects within a foreground region of the scene is generated based upon the light captured during the predefined time. Then, image capture device parameters are adjusted according to bit values of the depth mask prior to capturing a subsequent corresponding image of the scene.

In another embodiment, a method for adjusting image capture settings for an image capture device is provided. The method initiates with identifying a scene. Then, an image of the scene is captured. The method includes generating a depth mask of the scene from data defining the image of the scene. Then, pixel values corresponding to objects within any one or both of a foreground region and a background region of the captured image are adjusted based upon bit values of the depth mask.

In yet another embodiment, an image capture device configured to capture an image of a scene is provided. The image capture device includes depth logic configured to provide a depth mask associated with the scene. The depth mask is configured to distinguish between foreground objects and background objects within the scene. The image capture device also includes image capture logic configured to adjust a characteristic associated with the image based upon a corresponding bit value of the depth mask. The bit value determines whether the respective pixel is associated with one of the foreground objects and the background objects.

In still yet another embodiment, a system is provided. The system includes a computing device and a display screen in communication with the computing device. The display screen is configured to display an image of a scene. A video capture device in communication with the computing device is included. The video capture device provides scene image data to the computing device for presentation on the display screen. The video capture device includes depth logic and image capture logic. The depth logic is configured to provide a depth mask associated with the scene. The depth mask is configured to distinguish between foreground objects and background objects within the scene. The image capture logic is configured to adjust a characteristic associated with each pixel of the image data based upon corresponding data of the depth mask. The data of the depth mask determines a relative distance between an object associated with the corresponding pixel and the video capture device.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for a system and method for differentiating between foreground and background objects of a scene and subsequently adjusting image or video characteristics based upon whether the objects are located in the foreground or background. Alternatively, the image or video characteristics may be adjusted based upon the relative distance between the objects and the image capture device. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the present invention provide a method and system that eliminates the user from having to choose between foreground and background objects of a scene. Through the use of depth information, the scene may be segmented into regions of different depths. In addition, the depth information allows for the definition of an exact outline of the image, thereby providing a specific and accurate mechanism for controlling image capture device parameters, e.g., exposure/gain/brightness/gain and focus. The segmentation based upon depth information makes it possible to assign different parameter values to different pixel regions for a digital capture device. Thus, an image having the exposure/gain adjusted properly for both the foreground and background is enabled through the embodiments described below. The segmentation based upon depth is captured through a foreground/background depth mask which may be created through an image capture device having depth capability or through a light pulse/flash with a time of flight cut-off technique, both discussed in more detail below.

Figure 1:
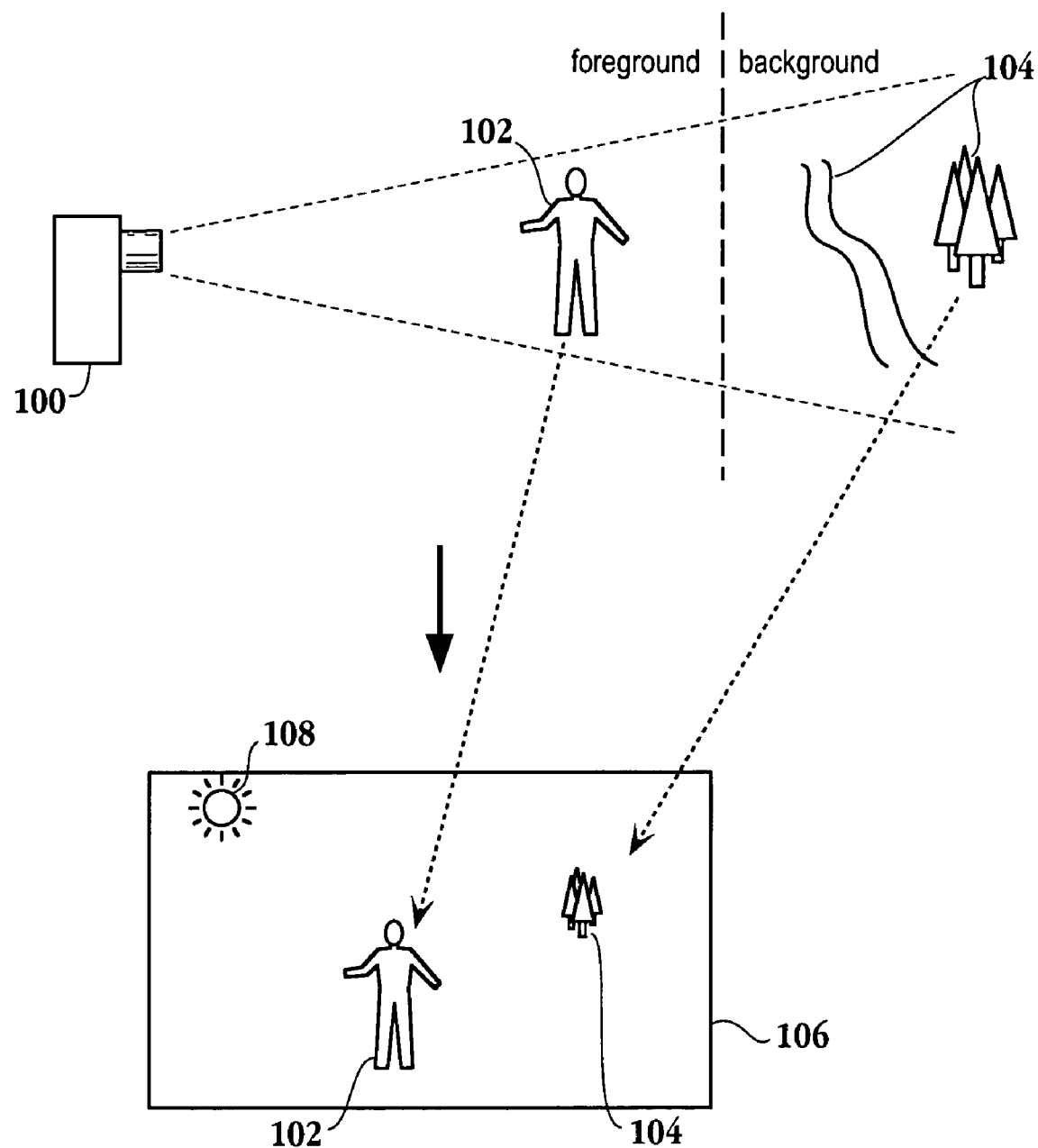
FIG. 1 is a simplified schematic diagram illustrating a scene having foreground and background objects, which is captured through an image capture device and subsequently displayed in accordance with one embodiment of the invention.

FIG. 1 is a simplified schematic diagram illustrating a scene having foreground and background objects which is captured through an image capture device and subsequently displayed in accordance with one embodiment of the invention. Image capture device 100 is configured to capture an image of a scene in which a person 102 is in the foreground and background scenery 104. The captured image of the scene is then displayed on display panel 106. Display panel 106 may be a display panel affixed to image capture device 100, e.g., a liquid crystal display (LCD) panel where the image capture device is a digital camera or camcorder. Alternatively, display panel 106 may be remote from image captures device 100, e.g., a television screen where the image capture device is a webcam used in conjunction with a computing device, such as a game console. As will be described in more detail below, foreground image 102 and background scenery 104 are capable of having their corresponding image or video characteristics independently compensated irrespective of their position in either the foreground or the background. While a single foreground image 102 is shown in FIG. 1, it should be appreciated that multiple foreground images may be captured. The image or video characteristics for each of the multiple foreground images may be independently adjusted based upon depth information. As used herein, image or video characteristics may refer to brightness, exposure, gain, focus and other suitable characteristics capable of being adjusted for image display. It should be appreciated that image or video characteristics may be referred to simply as characteristics and correspond to the inherent image data which improves the display quality of the image data through the embodiments described herein. Additionally, image capture device 100 may be a digital still camera, a single lens reflex camera, a video capture device, such as a web cam or camcorder, or any other suitable image capture device.

Image capture device 100, of FIG. 1, is capable of generating and utilizing a mask in order to identify objects as being within a foreground or background region as will be described in more detail below. This mask can then be used in order to compensate for the foreground and background regions, in order to provide a subsequent display which shows details for objects within both regions. For example, the use of backlight compensation to reduce the impact of a bright light source on the scene, such as sun 108, causes details to be defined for foreground objects, i.e., object 102, while the background images are washed out. While sun 108 is illustrated on display panel 106, it is shown for exemplary purposes and a scene need not include an actual image of the sun to be adversely impacted by the light originating from the sun. Without backlight compensation, foreground objects would be darkened and lose their corresponding detail in the resulting display. With the depth mask capability described in more detail below, the exact location of foreground and background and background objects in the scene may be determined. This location may be translated to a resulting image of the scene in order to manipulate corresponding pixel values to enhance the resulting image. In addition, image capture device settings, which include mechanical and electrical settings that affect the image or video characteristics of the resulting image, may be adjusted in order to provide optimized settings for the scene.

Where image capture device 100 is a video capture device, e.g., a web cam, the enhanced functionality enabled through the depth information provided by the mask may be applied to frames of the captured video in order to improve or enhance the image display. For example, where the video capture device is used to track an object or person subsequently incorporated into an interactive entertainment application, the mask may be applied to prevent difficulty encountered when tracking the object or person in the presence of a bright light source. With respect to a video game application in the home environment, such as the EYETOY™ application owned by the assignee, a user being tracked and incorporated into the video game may be positioned in front of a window. As explained below in more detail with reference to FIG. 4, if the window is allowing light from a bright light source through the window, then the user may become washed out and the window will become the focus of the capture device. It should be appreciated that backlight compensation techniques will not be effective here if the user is not in the center of the capture region.

Figure 2:
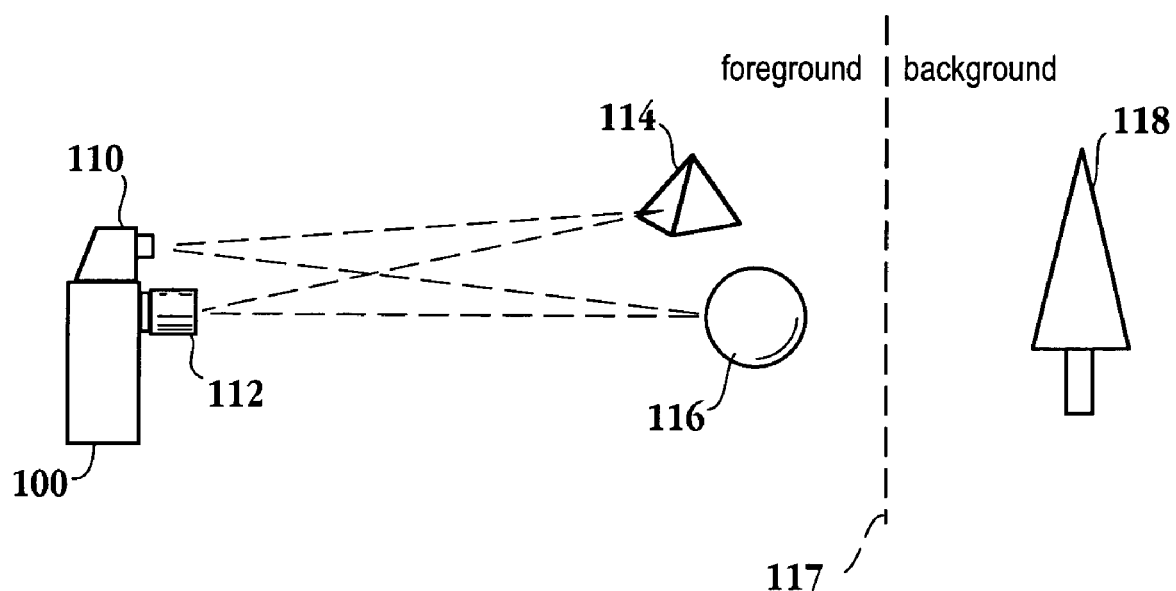
FIG. 2 is a simplified schematic diagram illustrating the generation of a depth mask for use in discerning between foreground and background objects in accordance with one embodiment of the invention.

FIG. 2 is a simplified schematic diagram illustrating the generation of a depth mask for use in discerning between foreground and background objects in accordance with one embodiment of the invention. It should be noted that the terms "depth mask" and "mask" are interchangeable as used herein and may include multiple depth layers. For example, the foreground and the background represent 2 depth layers, however, the scene may be segmented into more than two depth layers. Image capture device 100 includes light source 110. In one embodiment, light source 110 sends out a burst or pulse of light which is reflected by foreground objects 114 and 116. This reflected light is eventually captured by a sensor located behind lens 112 of image capture device 100. Of course, light source 110 may be a flash commonly used for cameras. One skilled in the art will appreciate that the sensor may be located anywhere on image capture device 100 that is capable of receiving the reflected light from the foreground objects within the scene for a defined time period.

As the speed of light is known, image capture device 100 of FIG. 2 may be configured to pulse the burst of light from light source 110 and open an aperture of image capture device 100 so that the reflected light from the foreground objects is received. The aperture will stay open for a predefined amount of time. The predefined amount of time is set so that light traveling from light source 110 and reflected back to image capture device 100, travels a defined maximum amount of distance. The maximum distance from image capture device 100 is illustrated as line 117. Therefore, any light which is reflected from a source past line 117 will not be received by image capture device as the aperture is closed prior to this reflected light reaching the sensor of the image capture device. Of course, the ambient light, i.e., the light not generated by the burst of light from the light source, is subtracted from the received light.

Various techniques may be used for the determining the foreground objects through the time of flight. One technique is through the use of a frequency of light not present in the ambient light. Alternatively, an image of the scene may be taken without the light on, then an image taken with the light from the light source. The light generated by the light source may then be determined by subtracting away the light not generated from the light source, i.e., the image taken without the light on, from the image taken with the light source. In yet another alternative, the amount of light reflected from the light source may be distinguished from ambient light by establishing a threshold of how much light must strike each pixel. Thus, a value which is less than the threshold would not be considered as light originating from the device and values greater than or equal to the threshold would be considered as originating from the light source of the device. Still yet another alternative that employs the use of a modulated light source. Here, the light from the light source is generated in a modulated format, e.g., a sine wave. The frequency chosen depends upon a range where no more than one period of the modulation covers the entire range from the light source and back to the device.

In one embodiment, the maximum amount of distance is defined as about four meters from the image capture device. From this data, a depth mask is created and stored in memory of the image capture device. This depth mask may then be used in conjunction with a simultaneous or subsequent captured image of the scene in order to compensate for the image or video characteristics for the foreground and background objects accordingly. It will be apparent to one skilled in the art that light source 110 may emit any suitable wavelength of light. In one embodiment, infrared light is emitted from light source 110.

In another embodiment, the depth mask defined through the reflected light is a binary bit mask. Here, a first logical value is assigned to locations in the mask associated with foreground images, while a second logical value is assigned to locations associated with background images. Thus, where image capture device 100 is a digital device, pixel data for an image associated with the depth mask may be manipulated to adjust the brightness of the foreground and background images. Where image capture device is a traditional camera, foreground and background images may be detected through the burst of light scheme described above. Based on the detection of the foreground and background images, the exposure, gain, brightness, focus, etc., settings of the camera may be adjusted prior to taking a picture of the scene. As mentioned above, the aperture size may be changed to manipulate the amount of light received by the image capture device. Of course, other mechanical and electrical settings may be adjusted where the mechanical or electrical settings impact the resulting photograph quality. Thus, both the foreground and background properties may be adjusted rather than having to choose between the foreground and the background.

Figure 3A:
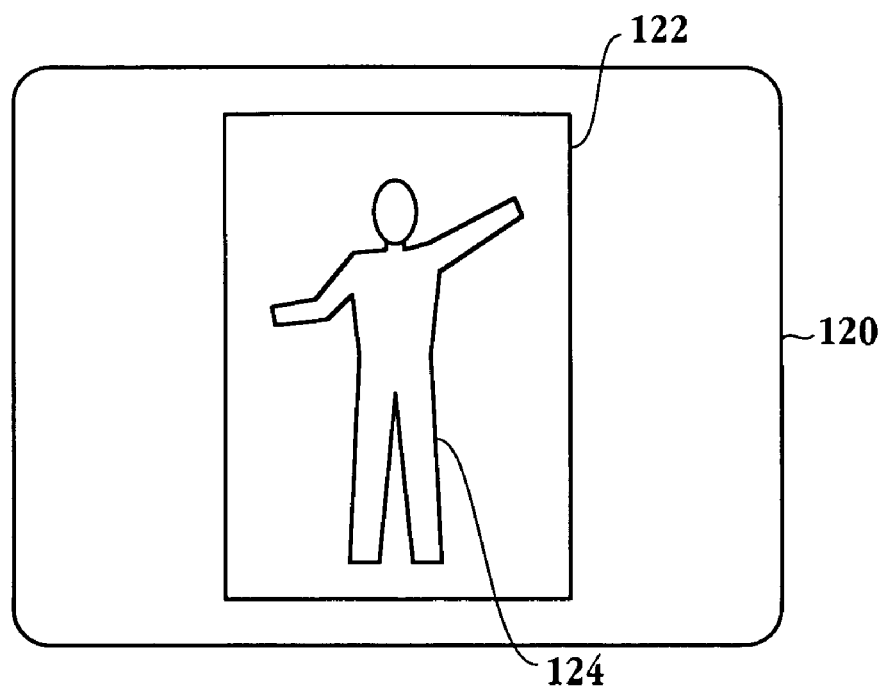
FIGS. 3A and 3B are simplified schematic diagrams illustrating the amount of detail enabled in defining foreground objects in accordance with one embodiment of the invention.
Figure 3B:
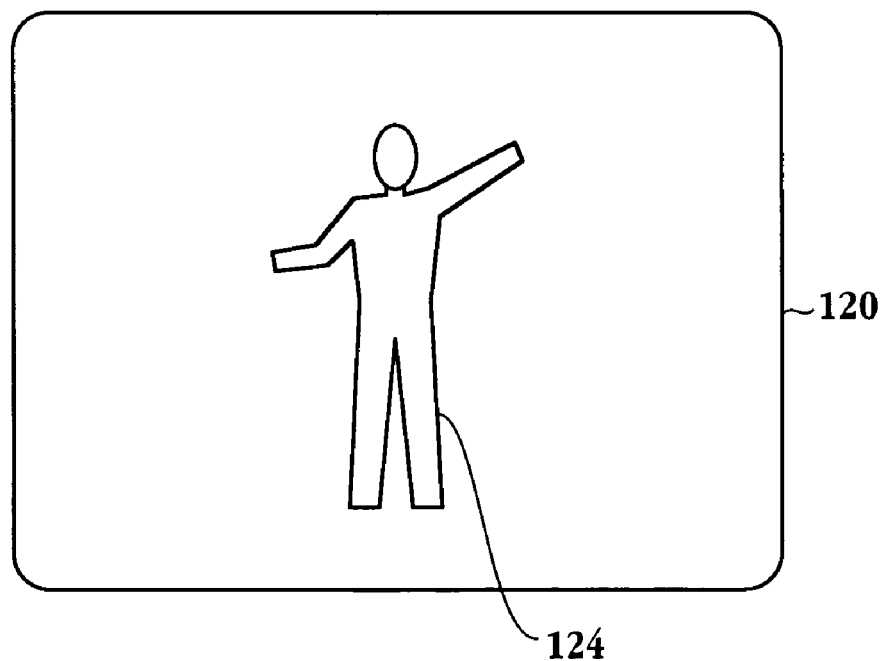

FIGS. 3A and 3B are simplified schematic diagrams illustrating the amount of detail enabled in defining foreground objects in accordance with one embodiment of the invention. FIG. 3A illustrates display screen 120 having a foreground object defined through rectangular region 122. FIG. 3B shows display screen 120 illustrating a foreground object 124 in which a mask has been defined, as described herein, in order to capture the exact outline of the foreground image. That is, with current auto focus, auto gain, backlight compensation techniques, the center of a scene in which an image capture device is targeting, is generally represented as an area and is incapable of outlining the exact image. Thus, as illustrated in FIG. 3A, rectangular region 122 includes the foreground object as well as other image data. Furthermore, the foreground object must be within a center region of the image or the auto focus, auto gain, or backlight compensation features will not work. In contrast, the depth mask captures any foreground object irrespective of its location within the scene. Moreover, the foreground object is captured without any additional image data being included. As mentioned above, for a digital device, the image or video characteristics for any foreground object may be manipulated by adjusting pixel values. With respect to a traditional film camera, the gain, exposure, focus, and brightness may be manipulated through mechanical or electrical adjustments responsive to the depth mask.

Figure 4:
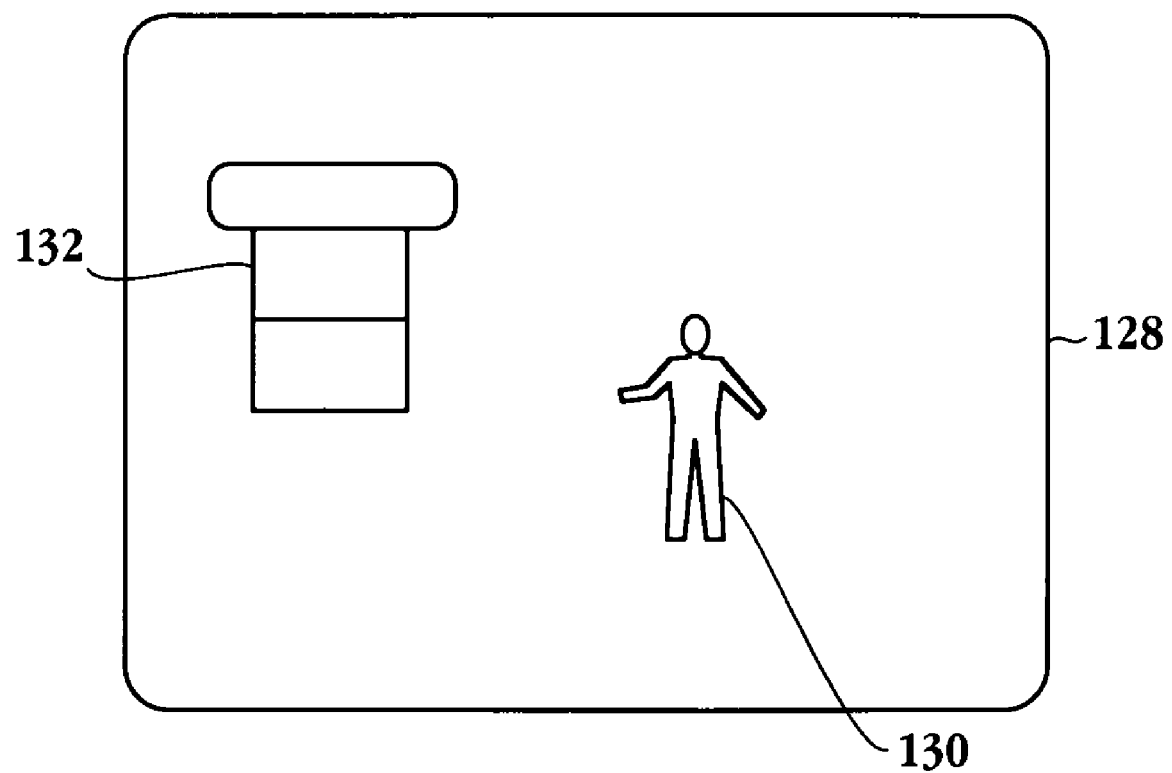
FIG. 4 is a simplified schematic diagram illustrating a captured image which is enhanced through a generated mask to define background and foreground images in accordance with one embodiment of the invention.

FIG. 4 is a simplified schematic diagram illustrating a captured image which is enhanced through a mask generated to define background and foreground images in accordance with one embodiment of the invention. Here, image scene 128 may be a scene captured through an image capture device such as a video cam or a web cam for an interactive gaming application where participant 130 is incorporated into the interactive gaming application. An exemplary interactive gaming application is the EYETOY™ interactive game application. Here, participant 130 is standing in front of a web cam or some other suitable video capture device. Behind participant 130 is window 132. It should be appreciated that where bright light is shining through window 132, the resulting image of participant 130 captured by the image capture device will become darkened. In an interactive video game application where tracking the user is important, the tracking will become difficult where the bright light darkens the image of the user. Thus, where the video cam incorporates the embodiments described herein, the user will be able to be tracked more easily. That is, a mask generated as described above, may be used to manipulate the pixel values to reduce the brightness.

Figure 5:
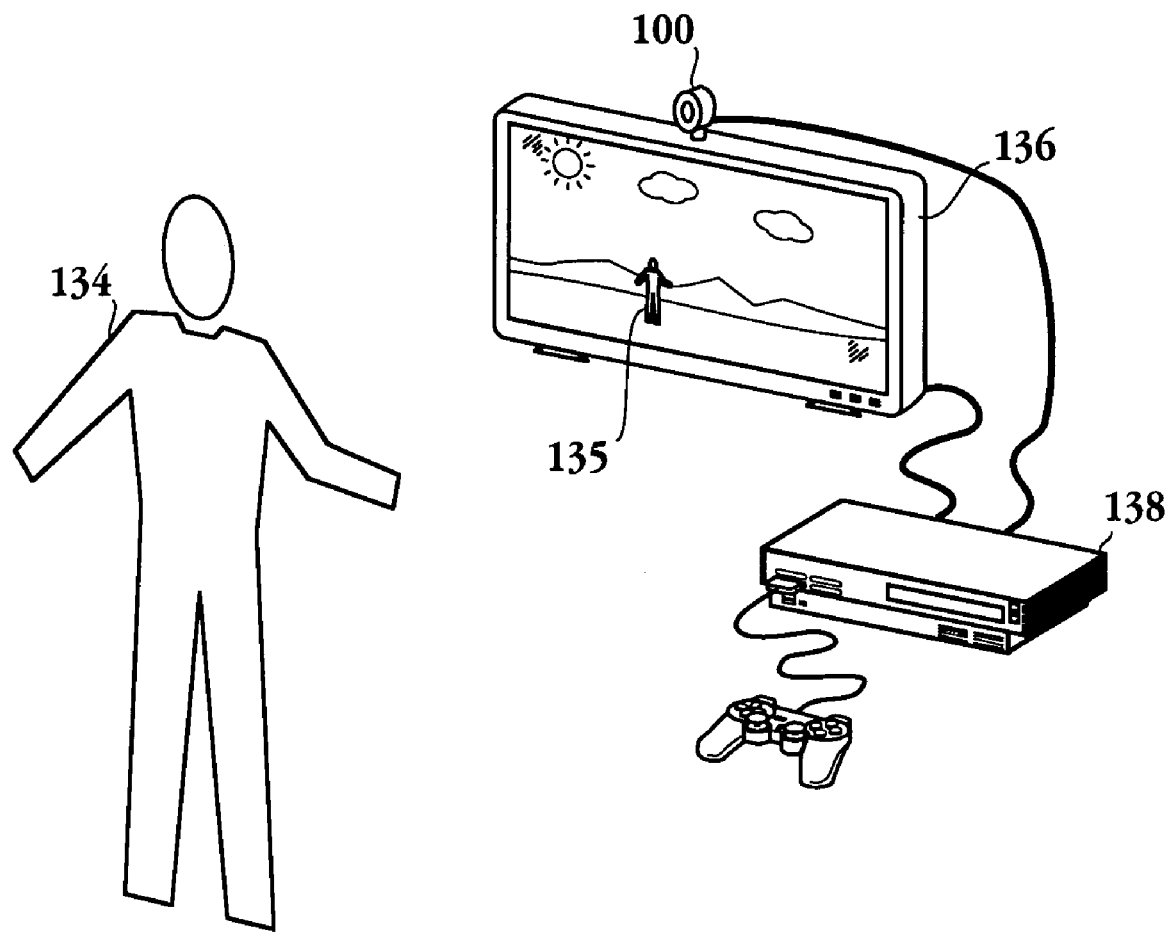
FIG. 5 is a simplified schematic diagram of an interactive entertainment system which utilizes the mask generation in order to more effectively track a user in accordance with one embodiment of the invention.

FIG. 5 is a simplified schematic diagram of an interactive entertainment system which utilizes the generated mask in order to more effectively track a user in accordance with one embodiment of the invention. Here, image capture device 100 is configured to capture an image of user 134 in order for the user's image to be displayed on display screen 136. Image capture device 100 is in communication with computing device 138, which in turn, is in communication with display screen 136. As can be seen, image 135 of user 134 is displayed on display screen 136. Thus, as user 134 moves, this movement is captured through image capture device 100 and displayed on display screen 136 in order to interact with the entertainment application. As mentioned above, the image capture device is configured to compensate for bright light entering through window 132.

Still referring to FIG. 5, image capture device 100 is a video capture device. Here, the pixel data associated with each video frame may be adjusted according to a corresponding depth mask. In one embodiment, a depth mask is generated for each video frame. In another embodiment, the depth mask is generated every x number of frames, where x may be any integer. For the frames not associated with a mask in this embodiment, the image or video characteristics from the last previous frame associated with a mask are applied to the frames not associated with a mask. Thus, the image or video characteristics may be frozen for a certain number of frames until a new mask is generated. It will be apparent to one skilled in the art that the processing for the functionality described herein may be performed by a processor of computing device 138. However, the depth mask may be generated by image capture device 100 and stored in memory of the image capture device. Of course, the image capture device would contain a microprocessor for executing the functionality for generating the depth mask and adjusting the image or video characteristics or adjusting the device parameters.

Image capture device 100 of FIG. 5 may generate the mask through the techniques described with reference to FIG. 2, however, image capture device 100 may alternatively include depth capturing logic, such as 3DV SYSTEM's ZCAM™ or similar products commercially available through CANESTA™. The depth capturing logic includes an image sensor that captures the depth value of each pixel in a scene in order to create a depth mask to be used as discussed herein. It should be noted that while a single user 134 is depicted in FIG. 5, it should be noted that multiple users may be incorporated in the embodiments described here. Since the depth mask enables adjustment of both foreground and background object image or video characteristics, it is not required that user 134 be located in the middle or any other particular area of the capture region for image captures device 100. It should be further appreciated that one exemplary system represented by FIG. 5 is the EYETOY™ system mentioned above.

Figure 6:
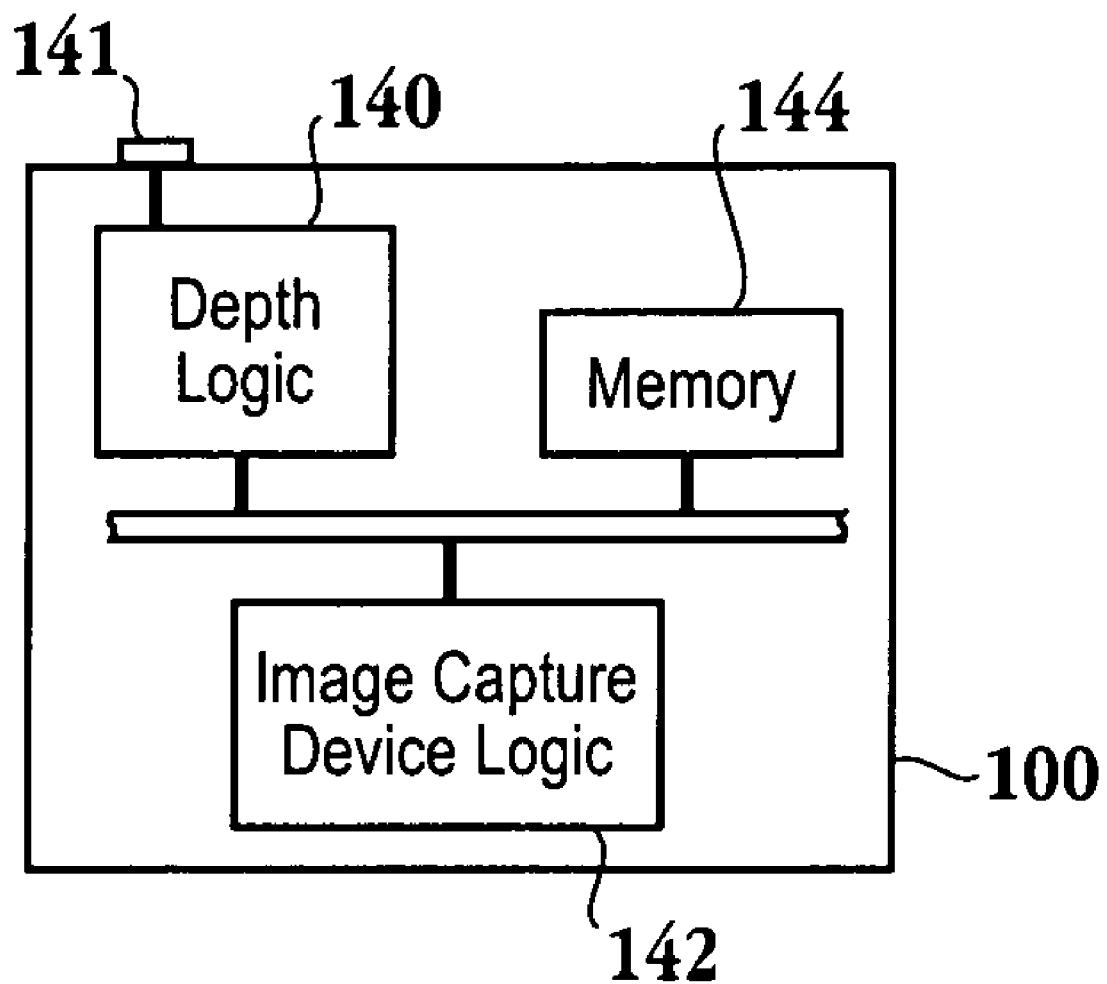
FIG. 6 is a simplified schematic diagram of an image capture device in accordance with one embodiment of the invention.

FIG. 6 is a simplified schematic diagram of an image capture device in accordance with one embodiment of the invention. Image capture device 100 includes depth logic 140, image capture device logic 142, and memory 144 all in communication with each other. As described herein, depth logic 140 includes circuitry configured to generate a mask in order for image capture device 100 to enhance a captured image with the assistance of the depth information. For example, depth logic 140 may generate the mask in order to differentiate between foreground and background objects within an image scene, and this mask will be stored in memory 144. Then, a corresponding scene of the image that is captured and processed by image capture device logic 142 will be enhanced. That is, certain image or video characteristics are manipulated as described herein depending on whether an object within the scene is located in the foreground or background, as determined by the depth mask. In one embodiment, depth logic 140 is activated by button 141 or some other suitable activation mechanism. Thus, a user has the option of activating the depth logic for enhanced image presentation, or bypassing the image presentation.

Figure 7:
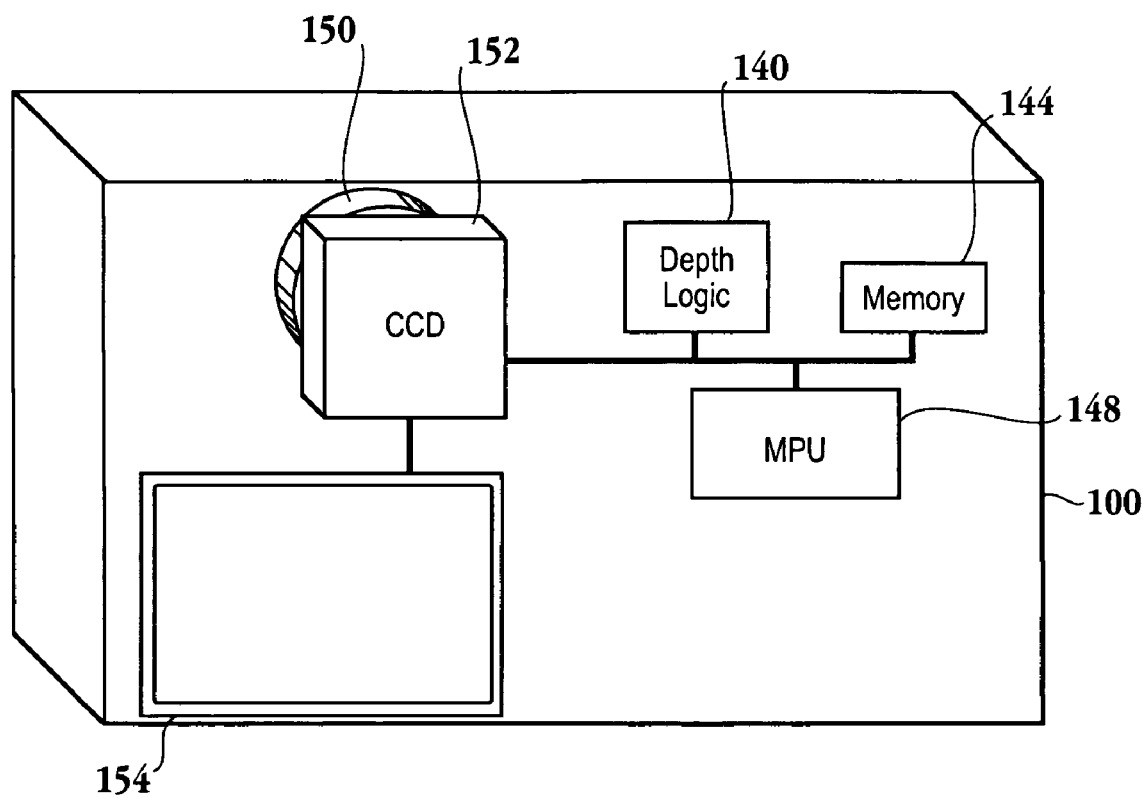
FIG. 7 is an alternative schematic diagram of an image capture device having logic configured to differentiate between foreground and background images in the invention.

FIG. 7 is an alternative schematic diagram of an image capture device having logic configured to differentiate between foreground and background images in the invention. Image capture device 100 includes lens 150 behind which is charged coupled device (CCD) 152. Depth logic 140, microprocessor unit (MPU) 148, and memory 144 are also included. Image capture device 100 includes display panel 154. It will be apparent to one skilled in the art that while image capture device 100 is depicted as a digital camera in FIG. 7, the invention is not limited to a digital camera. Depth logic module 140 may be included in a video capture device in order to adjust image or video characteristics of each frame or every $x^{th}$ frame.

Figure 8:
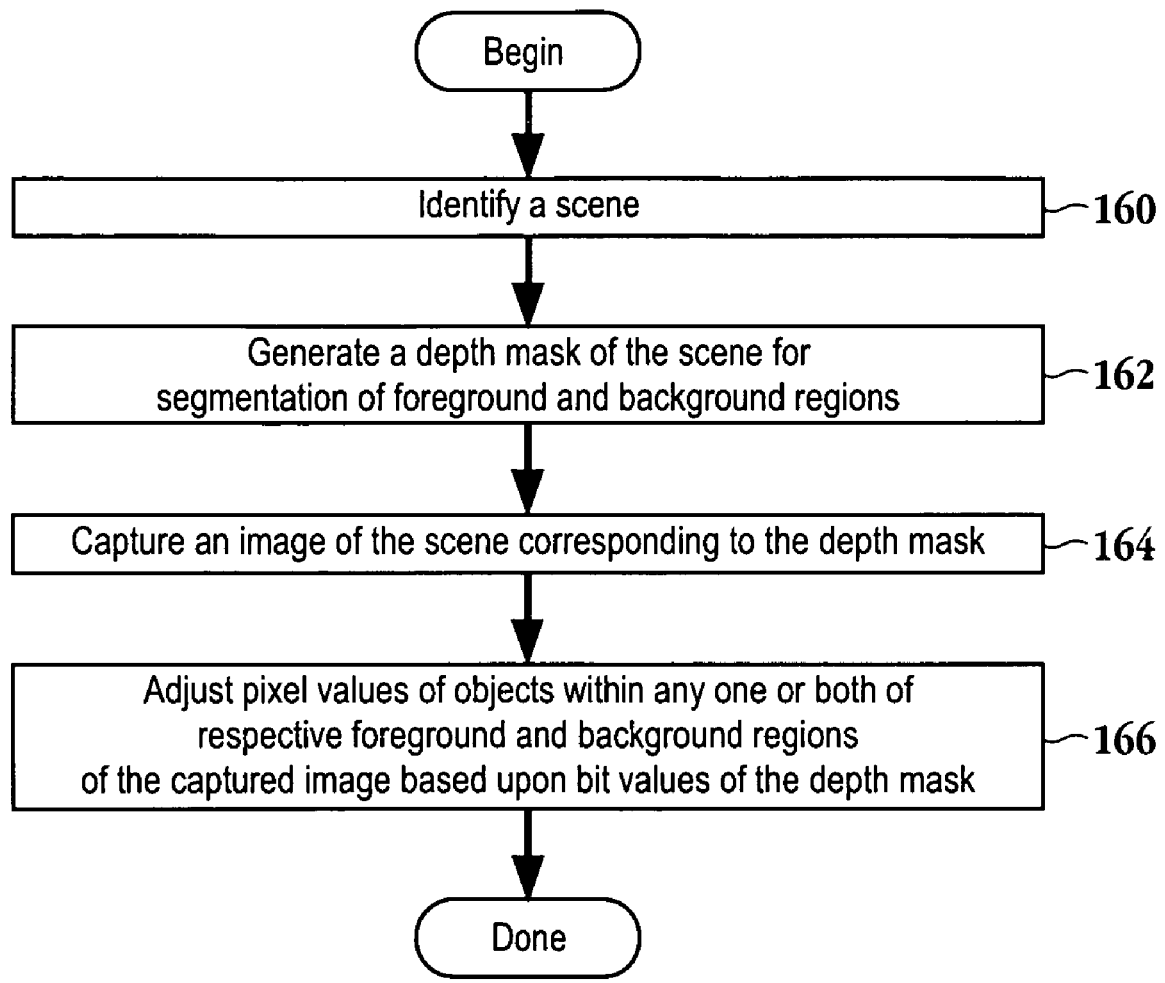
FIG. 8 is a flow chart diagram illustrating the method operations for adjusting image capture settings for an image capture device in accordance with one embodiment of the invention.

FIG. 8 is a flow chart diagram illustrating the method operations for adjusting image capture settings for an image capture device in accordance with one embodiment of the invention. The method initiates with operation 160 where a scene is identified. Here, an image capture device may be used to identify a scene defined by a capture region. Of course, the image capture device may be a video capture device. The method then advances to operation 162 where a depth mask of the scene is generated for segmentation of foreground and background regions. In one embodiment, the depth mask is generated by pulsing light and capturing reflections from an object within a certain distance as described with reference to FIG. 2. Here the light may be infrared light. In another embodiment, the image capture device includes depth logic capable of capturing a depth value for each pixel. One exemplary image capture device with depth logic is the ZCAM™ mentioned above. The method then proceeds to operation 164 where an image of the scene is captured and this captured image corresponds to the depth mask. It should be appreciated that for the ZCAM™ embodiment, operations 162 and 164 are performed simultaneously. The method then moves to operation 166 where pixel values of objects within either, or both, of the foreground and background regions of the captured image are adjusted. This adjustment is based upon the depth mask defined above.

For example, the depth mask may be defined through bit values where a first bit value is assigned to foreground objects and a second bit value is assigned to background objects. The adjustment then enhances the brightness of foreground objects while decreasing the brightness of background objects where a bright light source exists in one embodiment. Where the image capture device is not a digital device, e.g., a SLR camera, mechanical or electrical adjustments of the image capture device parameters may be made as a result of the foreground and background objects identified by the bit mask. These mechanical or electrical adjustments may include defining an aperture size corresponding to a certain exposure level, lens settings for a particular focus level, etc. In another embodiment, the pixel values are adjusted according to depth information included with the image data, i.e., distance information tagged to each pixel of the image data. One skilled in the art will appreciate that the aperture size may be controlled mechanically or electronically. The electronic control may be performed through a sensor on a chip. Thus, each pixel adjusted separately with the electronic control.

In summary, an image capture device capable of generating a depth mask for corresponding segments of a scene is provided. It should be appreciated that while the invention has been described in terms of the background and foreground segments (2 layers) of a scene, the embodiments described herein may be extended to any number of layers of the scene. Through the depth mask, the image or video characteristics for an image may be selectively adjusted irrespective of where an object is located in the scene. Furthermore, the capture device described herein enables enhanced functionality for interactive entertainment applications. For example, with respect to a video game application, where a user is tracked to incorporate his image into the video game, the capture device described above enables for enhanced tracking of the user. The user is free to move anywhere in the capture region and is not limited to one area, such as a center region. Additionally, as the user moves in front of a bright light source, e.g., sunlight coming through a window, the detail of the user's image is not lost. With respect to a video capture device, the adjustments may be applied every interval of frames in order to avoid constant adjustments from occurring. For example, if a user briefly holds up a black piece of paper in front of him, the frame interval delay will prevent the user from suddenly turning darker. Also, if the user temporarily leaves the field of view of the image capture device and comes back, the adjustment and re-adjustment of the scene is avoided.

It should be appreciated that the embodiments described above may be extended to other systems in addition to an interactive entertainment input device, i.e., the EYETOY™ system capture device. For example, the video capture device may be used in a videoconferencing system to provide enhanced video images for the conference. Here, the capture device may not be used for tracking purposes, but for the enhancement of the image or video characteristics enabled through the depth information.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced. Accordingly, the present embodiments are to be considered as illustrative and not restrictive, and the invention is not to be limited to the details given herein, but may be modified within the scope and equivalents of the description.

What is claimed is:

1. A method for differentiating between foreground objects and background objects within a scene being captured through an image capture device, comprising:
   emitting a ray of light from a light source toward an object of the scene;
   opening an aperture cover allowing access to a sensor of the image capture device for reflected light from the light source;
   closing the aperture cover after a set time, the predefined amount of time corresponding to a maximum distance traveled by the light;
   generating a depth mask identifying objects within a foreground region and a background region of the scene based upon the light captured during the set time, the depth mask identifying objects within the foreground region with a first bit value and identifying objects within the background region with a second bit value;
   adjusting an image capture device parameter according to bit values of the depth mask for one or more of a sequence of captured image frames of the scene, wherein the image capture device parameter is selected from one of brightness, exposure or gain;
   applying the adjusted image capture device parameter so that the brightness, exposure, or gain of the captured image frames is adjustable independently for both of the objects within the foreground region and the objects within the background region; and
   tracking an object within the foreground region, the tracking being enhanced by the applied adjusted image capture device parameter.

2. The method of claim 1, further comprising:
   storing the depth mask in memory of the image capture device.

3. The method of claim 1, wherein the light source is configured to emit infrared light.

4. The method of claim 1, wherein the method operation of opening an aperture cover allowing access to a sensor of the image capture device includes,
   receiving reflected light from the objects within the foreground region.

5. The method of claim 1, wherein the method operation of adjusting image capture device parameters according to bit values of the depth mask includes,
   determining an optimal amount of light based upon the depth mask; and adjusting the aperture cover to allow the optimal amount of light into the image capture device.

6. The method of claim 1, wherein the image capture device parameters are adjusted through mechanical adjustments.

7. The method operation of claim 1, wherein the method operation of emitting a ray of light from a light source toward an object of the scene includes, pulsing infrared light from the light source.

8. The method of claim 1, further comprising, adjusting a focus parameter of the image capture device according to the bit values of the depth mask, so that the objects within the foreground region are in focus.

9. The method of claim 1, wherein the adjusted captured image frames facilitates tracking of the objects within the foreground region by reducing brightness of the background region.

10. A method for adjusting image capture settings for an image capture device, comprising:

identifying a scene;

capturing an image of the scene through the image capture device;

generating a depth mask of the scene from data defining the image of the scene;

adjusting pixel values of the data defining the image corresponding to objects within any one or both of a foreground region and a background region of the captured image, wherein the adjusting of pixel values is according to bit values of the depth mask, wherein the adjusting pixel values causes a change in brightness such that both of the pixel values associated with the foreground region and pixel values associated with the background region are adjustable independently for brightness; and tracking an object within the foreground region, the tracking being enhanced by the adjusting of pixel values.

11. The method of claim 10, wherein the method operation of generating a depth mask of the scene from data defining the image of the scene includes, segmenting the foreground and background regions of the scene.

12. The method of claim 10, wherein the data defining the image of the scene includes pixel data where each pixel is tagged with distance information.

13. The method of claim 10, wherein the image capture device is selected from the group consisting of a digital camera, a web cam, and a camcorder.

14. The method of claim 10, further comprising:

displaying a portion of the image of the scene having adjusted pixel values.

15. The method of claim 14, wherein the portion of the image of the scene is an image of a participant for use in an interactive gaming application.

16. The method of claim 10, wherein the adjusting of pixel values facilitates tracking of the objects within the foreground region by reducing brightness of the background region.

17. The method of claim 10, wherein the foreground and background regions define two layers of the scene;

wherein the scene includes additional layers; and wherein the method operation of adjusting pixel values is performed for data defining the image corresponding to objects within any one of the layers of the scene.

18. An image capture device configured to provide an image of a scene, comprising:

depth logic configured to provide a depth mask associated with the scene, the depth mask configured to distinguish between foreground objects and background objects within the scene;

image capture logic configured to adjust an image capture device setting for a characteristic associated with the image based upon a corresponding bit value of the depth mask, wherein the bit value determines whether the respective pixel is associated with one of the foreground objects and the background objects, and the image capture logic is configured to apply the adjusted image capture device setting so that the pixels of the image associated with both of the foreground objects and the background objects are adjustable independently for the characteristic, wherein the characteristic is selected from a group consisting of exposure, gain, and brightness; and tracking logic configured to track an object within the foreground region, the tracking being enhanced by the applied adjusted image capture device setting.

19. The image capture device of claim 18, wherein the depth mask is a bit mask having a first logical value assigned to represent the foreground objects and a second logical value assigned to represent the background objects.

20. The image capture device of claim 18, further comprising:

a sensor in communication with the depth logic, the sensor configured to receive a light signal reflected from one of the foreground objects, the receipt of the light signal indicating a location corresponding to one of the foreground objects.

21. The image capture device of claim 18, wherein each logic element is one or a combination of hardware and software.

22. The image capture device of claim 18, wherein the image capture device is a video capture device.

23. The image capture device of claim 22, wherein the depth logic is further configured to periodically provide a depth mask for a sequence of video frames captured by the video capture device.

24. The image capture device of claim 18, wherein the image capture device setting is adjusted through one of a mechanical or electrical adjustment.

25. The image capture device of claim 18, wherein the image capture logic is further configured to adjust each pixel of image data of the scene.

26. The method of claim 18, further comprising, image capture logic configured to adjust an image capture device setting for focus based upon a corresponding bit value of the depth mask, so that the foreground objects are in focus.

27. The method of claim 18, wherein the adjusted pixels of the image facilitates tracking of the foreground objects by reducing brightness of the background objects.

28. A system, comprising:

a computing device;

a display screen in communication with the computing device, the display screen configured to display an image of a scene;

a video capture device in communication with the computing device, the video capture device providing scene image data to the computing device for presentation on the display screen, the video capture device including, depth logic configured to provide a depth mask associated with the scene, the depth mask configured to distinguish between foreground objects and background objects within the scene;

image capture logic configured to adjust an image capture device setting for a characteristic associated with each pixel of the image data based upon depth information;

image capture logic configured to apply the adjusted image capture device setting so that each pixel of the image is adjustable independently of another pixel for the characteristic, whether associated with the foreground objects or the background objects, and wherein the characteristic is selected from the group consisting of exposure, gain, and brightness; and tracking logic configured to track an object within the foreground region, the tracking being enhanced by the applied adjusted image capture device setting.

29. The system of claim 28, wherein the computing device is a game console.

30. The system of claim 29, wherein the scene image data includes an image of a person, the image of the person being incorporated into a video game for interaction therein.

31. The system of claim 28, wherein the depth logic is further configured to periodically provide a single depth mask for a sequence of video frames captured by the video capture device.

32. The system of claim 28, wherein the image capture device setting is adjusted through one of a mechanical or electrical adjustment.

33. The system of claim 28, wherein the video capture device is a webcam.

34. The system of claim 28, wherein the image data defines data for each pixel, the data for each pixel including distance information.

35. The system of claim 28, wherein the depth information is obtained from a depth mask, the depth mask defining a relative distance between an object associated with the corresponding pixel and the video capture device.

36. The system of claim 28, further comprising,
image capture logic configured to adjust an image capture device setting for focus based upon depth information, so that the foreground objects are in focus.

37. The system of claim 28, wherein adjusted pixels of the image facilitates tracking of the foreground objects by reducing brightness of the background objects.

* * * * *